United States Patent
Yamamoto et al.

(10) Patent No.: US 6,870,592 B1
(45) Date of Patent: Mar. 22, 2005

(54) LIQUID-CRYSTAL DISPLAY PANEL WITH SPACER IN PIXEL ELECTRODE CONTACT HOLE AND METHOD FOR MANUFACTURING SAME

(75) Inventors: Yuji Yamamoto, Tokyo (JP); Mamoru Okamoto, Tokyo (JP); Michiaki Sakamoto, Tokyo (JP); Takahiko Watanabe, Tokyo (JP); Hirofumi Ihara, Tokyo (JP); Hironori Kikkawa, Tokyo (JP); Shinichi Nakata, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/594,721

(22) Filed: Jun. 16, 2000

(30) Foreign Application Priority Data

Jun. 17, 1999 (JP) .......................................... 11/171294

(51) Int. Cl.$^7$ .......................................... G02F 1/1339
(52) U.S. Cl. ..................................................... 349/155
(58) Field of Search ............................... 349/155, 156, 349/157

(56) References Cited

U.S. PATENT DOCUMENTS

| 4,763,995 | A |   | 8/1988 | Katagiri et al. |
| 4,904,056 | A |   | 2/1990 | Castleberry |
| 5,181,132 | A | * | 1/1993 | Shindo et al. ............... 349/155 |
| 5,757,451 | A | * | 5/1998 | Miyazaki et al. ........... 349/106 |
| 5,917,572 | A | * | 6/1999 | Kurauchi et al. ........... 349/156 |

FOREIGN PATENT DOCUMENTS

| JP | 60-164723 | 8/1985 |
| JP | 4-226424 | 8/1992 |
| JP | 4-318816 | 11/1992 |
| JP | 10-68961 A | 3/1998 |
| JP | 10-282327 | 10/1998 |
| JP | 10-290732 | 11/1998 |

* cited by examiner

*Primary Examiner*—Tarifur R. Chowdhury
*Assistant Examiner*—Timothy Rude
(74) *Attorney, Agent, or Firm*—Foley & Lardner LLP

(57) ABSTRACT

In a liquid-crystal display panel, columnar spacers are formed on a substrate on the transparent electrode side in minimally a part of the pixel parts of a plurality of pixel parts, in which there is little variation in the film thickness of a plurality of films formed over the substrate.

11 Claims, 5 Drawing Sheets

Fig. 2 (AMENDED)
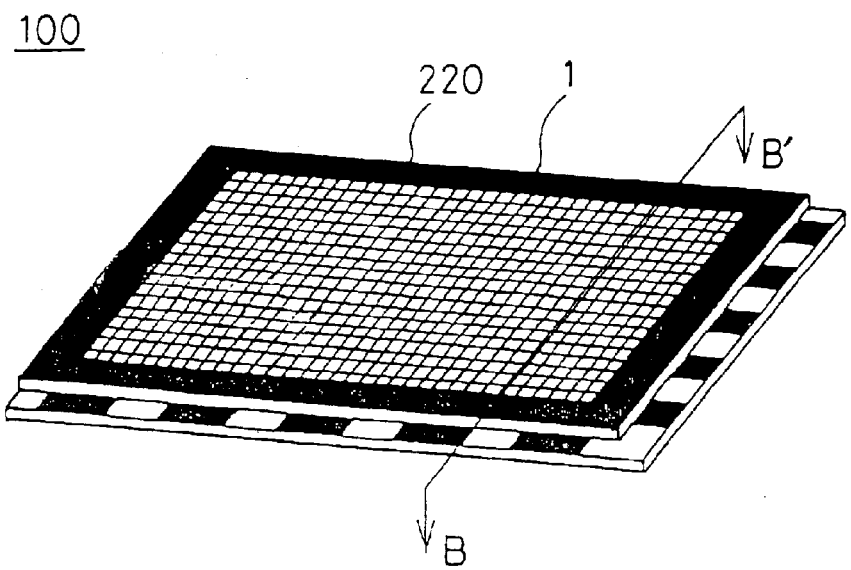

Fig. 5 (AMENDED)
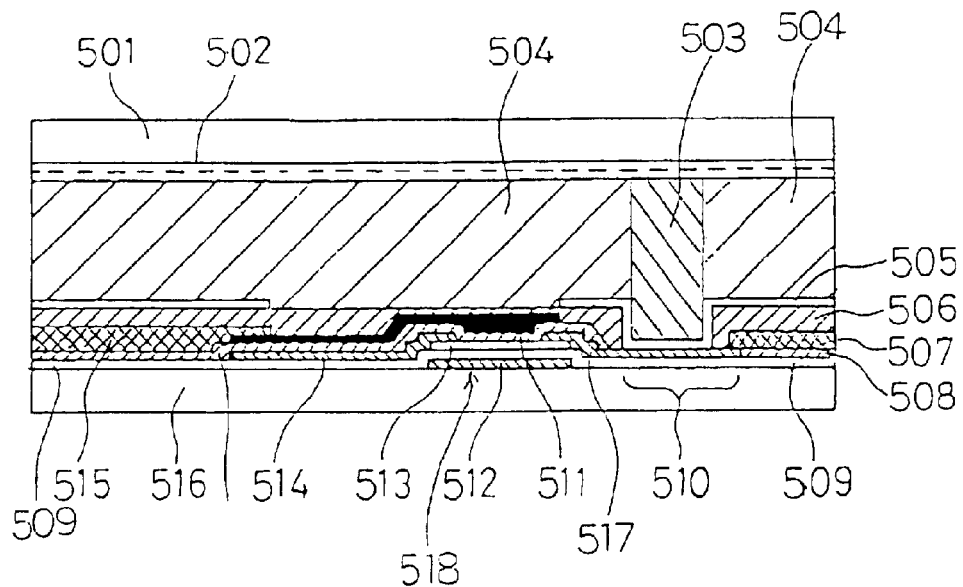

Fig. 7 (AMENDED)
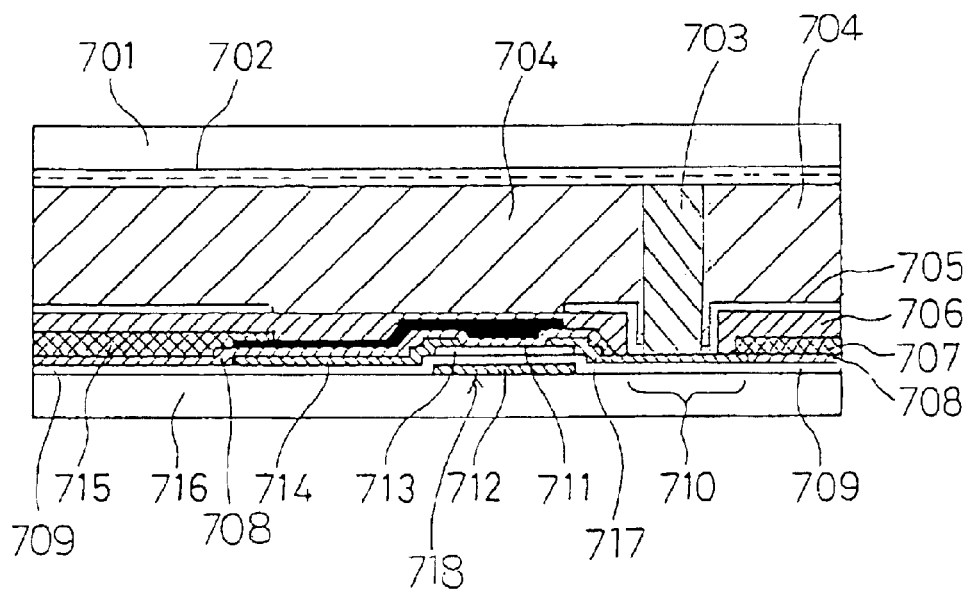

US 6,870,592 B1

LIQUID-CRYSTAL DISPLAY PANEL WITH SPACER IN PIXEL ELECTRODE CONTACT HOLE AND METHOD FOR MANUFACTURING SAME

BACKGROUND OF THE INVENTION

1. Field of the Invention

The present invention relates to a liquid-crystal display panel and to a method for manufacturing a liquid-crystal display panel, and more particularly it relates to a liquid-crystal display panel with improved accuracy in the gap between panels and in which deterioration of display characteristics such as contrast is prevented, and to a method for manufacturing such a liquid-crystal display panel.

2. Description about the Related Arts

In the past, liquid-crystal display panels, both color and monochrome types, have found widespread use as a means for displaying information.

In such a liquid-crystal display panel, the achievement of a uniform gap between panels assembled in the display is important.

To achieve that end, spherical gap material known as micropearls, made of acrylic resin or $SiO_2$ are generally dispersed onto the glass substrate on which TFTs are formed, after which the opposing glass substrate is placed thereover.

In the above-noted method, however, because the micropearls that serve as the gap material are dispersed impartially on the display elements and interconnects, an electrical charge or the like on the glass substrates can cause variation in the distribution of the micropearls, thereby resulting in non-uniformity in the gap in the panel.

Another phenomenon is the collection of micropearls in the depressed aperture part of the glass substrate, thereby disturbing the orientation of the liquid crystal and leading to such problems as a loss of display contrast, which lowers the display quality.

Given the above-noted problems, there is in Japanese Unexamined Patent Publication (KOKAI) No. 10-282327, a disclosure of a non-conductive substance formed into a columnar shape to serve as gap spacers in a non-display region on a glass filter.

In the Japanese Unexamined Patent Publication (KOKAI) No. S60-164723, there is a disclosure of the formation of an insulating substance into a columnar shape on a TFT.

As a similar technology, there is a disclosure of the formation of an insulating substance into a columnar shape in the same manner over display interconnects of a TFT substrate.

The above-noted technologies eliminate the micropearls from the display region, and form gap spacers in locations corresponding to areas above the TFTs or interconnects other than the aperture part with a uniform density, so that in liquid-crystal panel having independent color filter and TFT substrates, there is an improvement in contrast, and even when spacers are formed, because these are in relatively thin parts, the accuracy of the gap between the panel surfaces is improved, thereby achieving the effect of improving the display quality.

The above-noted disclosed technologies, however, actually lead to another problem of non-uniformity in the gap within the panel, in that this is a CF-on-TFT (color filter on TFT) panel.

In CF-on-TFT technology, a color layer is formed directly on the TFT aperture part, so as to eliminate the reduction of the numerical aperture occurring because of offset in the alignment of the color filter substrate and the TFT substrate at the time of alignment, and is an effective technology with respect to achieving large glass substrates, a expanded display area, and fine display pixels.

In the prior art, because of the CF-on-TFT structure, each color layer, as shown in FIG. 4, must be formed so as to extend to the TFT signal electrode lines and the gate electrode lines.

Additionally, in order to eliminate metallic reflections from interconnects of external light, a black matrix is formed, not only over the TFTs, but also over the signal electrode lines and the gate electrode lines. Considering the positioning accuracy between the TFT and the various lines, the color layers and black matrix, pattern application methods such as the pigment distribution method, the printing method, the electrical deposition method, and the ink-jet method are applied.

With the above-noted pattern application methods, however, each time one layer is formed a variation in film thickness of 01. to 0.2 $\mu$m occurs within the panel, this variation tending to be particularly large over interconnects and the TFTs.

For this reason, in a CF-on-TFT panel, if columnar spacers 403 re formed as gap spacers over the TFTs and interconnects, there is an interaction between the black matrix and the color layers and the variation in application of the columnar spacers with acts to worsen the uniformity of the gap between the panel surfaces.

In Japanese Unexamined Patent Publication (KOKAI) No. 4-226424, there is a disclosure of technology for making the spacers or the like a metal light-blocking layer having aluminum as the main component when assembling a piece of electronic equipment having spacers or the like, and in Japanese Unexamined Patent Publication (KOKAI) No. 4-318816, there is language describing a liquid-crystal display panel with a spacer disposed in the liquid-crystal region between a color filter and the opposing substrate.

In neither of these disclosures, however, is there language with regard to forming an disposing columnar spacers in parts of the film having uniform thickness.

Accordingly, in order to improve upon the above-noted drawbacks in the prior art, it is an object of the present invention to provide a liquid-crystal display panel, including a color liquid-crystal display panel, which has a gap of superior uniformity within the panel, without a worsening of display characteristics such as contrast.

SUMMARY OF THE INVENTION

In order to achieve the above-noted object, the present invention has the following technical constitution.

Specifically, a first aspect of the present invention is a liquid-crystal display panel 100 wherein the liquid-crystal display panel comprising a plurality of pixels; and a columnar spacer 203 formed and disposed on a portion of a surface of a multi-layered films formed on a surface of a substrate facing to a transparent electrode 205 Provided in at least part of pixels among a plurality of pixel portions forming a liquid-crystal display panel and said portion of said multi-layered film having little variation in thickness.

A second aspect of the present invention is a method for manufacturing a liquid-crystal display panel comprising, forming in each of a plurality of pixel regions on a substrate 216 a color film 207, 215, a signal electrode (a source electrode of a TFT) 214, a gate electrode 212, and a drain electrode of the TFT 217, forming a transparent pixel electrode film 205 thereover, then forming a columnar spacer 203 on said transparent pixel electrode film 205 minimally in a part of contact holes 210 provided on said pixel regions; and then disposing an opposing substrate 201 on which is formed an opposing common transparent electrode 202 so as to oppose said transparent pixel electrode film 205.

By adopting the above-described constitution, in the liquid-crystal display panel and method for manufacturing a liquid-crystal display panel according to the present invention, the number of functional film types formed on the substrate is small, and spacers are formed at contact hole parts at which the film thickness is always uniform. More specifically, for example, by applying the present invention to a color liquid-crystal display panel, in a color liquid-crystal display panel (hereinafter referred to as a CF-on-TFT panel) in which a color filter is formed on the TFTs, at a contact hole for the purpose of supplying a signal voltage from a source electrode of a TFT to a transparent pixel electrode 205 (hereinafter referred to as ITO), a columnar protrusion is provided as a spacer for maintaining the panel gap.

BRIEF DESCRIPTIONS OF THE DRAWINGS

FIG. 2 is a perspective view showing a general view of a liquid-crystal display panel according to the present invention.

FIG. 5 is a cross-section view showing the configuration of another embodiment of a liquid-crystal display panel according to the present invention.

FIG. 7 is a cross-section view showing the configuration of yet another embodiment of a liquid-crystal display panel according to the present invention.

DETAILED DESCRIPTION OF THE PREFERRED EMBODIMENTS

Detailed embodiments of a liquid-crystal display panel and a method for manufacturing a liquid-crystal display panel according to the present invention are described in detail below, with references being made to relevant accompanying drawings.

Figure 1:
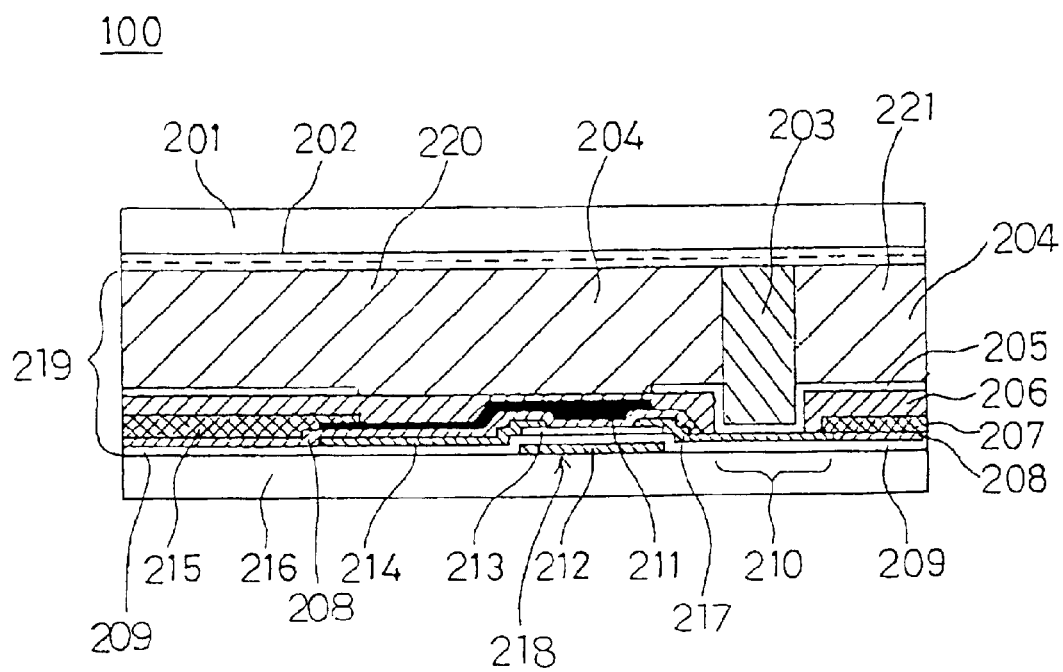
FIG. 1 is a cross-section view showing the configuration of an embodiment of a liquid-crystal display panel according to the present invention.

Specifically, FIG. 1 is a partially enlarged drawing illustrating the configuration of a liquid-crystal display panel 100, which is an embodiment of the present invention. In the liquid-crystal display panel 100 shown in FIG. 1, columnar spacers 203 are formed and disposed in a part of a plurality of films formed on a substrate 216 on the transparent pixel electrode 205 side in minimally parts 220 and 221 of the pixels of a plurality of pixels making up the liquid-crystal display panel 100 in which the variation is film thickness is small.

As a result of continuing studies to solve the above described problems of the past, it is known that, of the color layers 207 and 215, gate electrode film layer, amorphous silicon film layer 213, signal electrode film layer (source electrode of a TFT) 214, drain electrode of the TFT 217, black matrix film layer 211, pixel electrode film layer, insulation film layer 208, 209, overcoating film layer 206, transparent pixel electrode film layer 205 and the like that are formed on the transparent pixel electrode 205 side transparent substrate 216, in the parts in which these layers are laminated together in a complex manner, the contact hole is the most suitable as a part having little variation in film thickness in the pixel parts 220 and 221.

Figure 3:
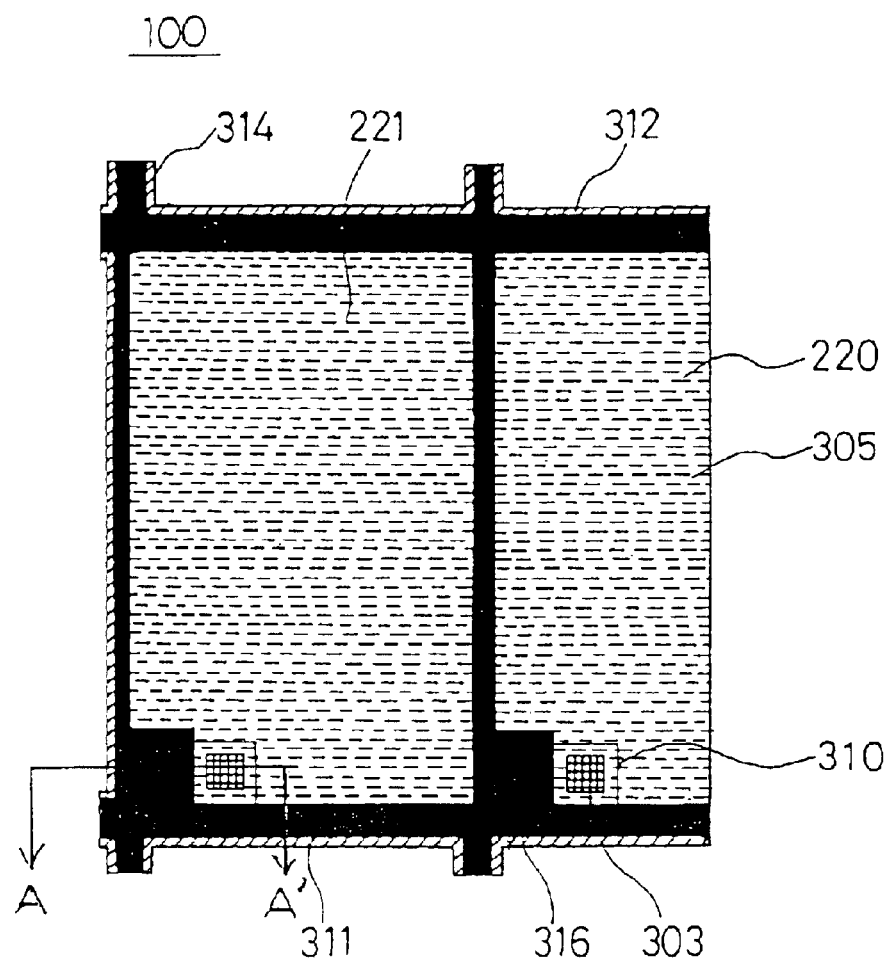
FIG. 3 is a plan view shown an example of a pixel region in a liquid crystal display panel according to the present invention
Figure 4:
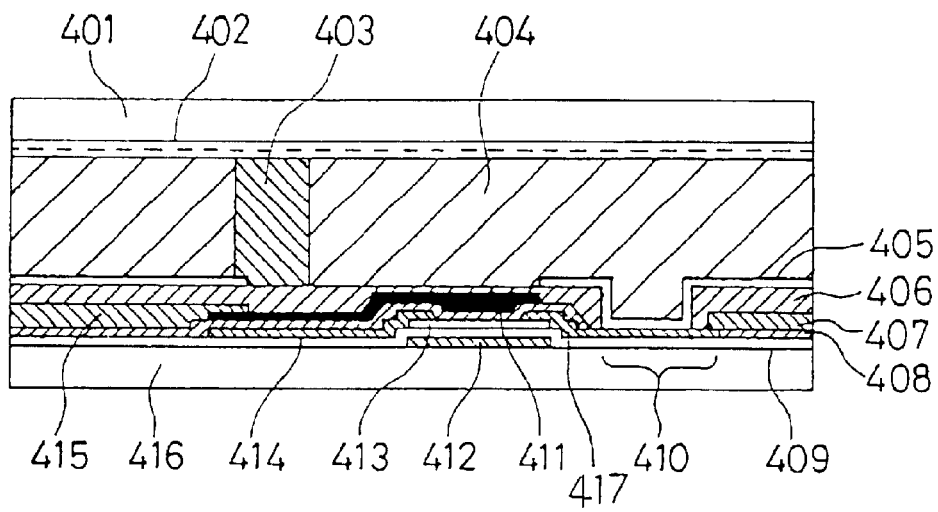
FIG. 4 is a cross-section view showing an example of the configuration of a liquid-crystal display panel of the past.

That is, in the present invention columnar spacers 203 of an appropriate height are formed in contact hole parts indicated as 310 in the in the enlarged drawing of the pixel area in the liquid-crystal display panel 100 shown in FIG. 3, FIG. 1 is a cross-section view of the liquid-crystal display panel 100 of FIG. 3 seen along the cutting line A—A.

Therefore, in the liquid-crystal display panel 100 according to the present invention, the columnar spacers 203 are designed so as to have a uniform height, the thickness of the lower layer film in the contact hole 210 is uniform and well formed at any of the contact holes 210, so that the gap between the two opposing substrates 216 and 201 is accurately set at the prescribed value.

Note that the substrate 201 is provided with a common transparent electrode 202.

In the liquid-crystal display panel 100 according to the present invention, the columnar spacers 203 can be formed on the transparent pixel electrode film 205, and further the columnar spacers 203 can be formed on the drain electrode of the TFT 217, passing through the transparent pixel electrode film 205.

Additionally, the columnar spacers 203 used in the present invention can be made of either an inorganic material or an organic material.

Additionally, the liquid-crystal display panel 100 of the present invention can be either a color liquid-crystal display panel or a monochrome liquid-crystal display panel.

An embodiment of a liquid-crystal display panel 100 according to the present invention is described below in further detail, for the case of application to a color liquid-crystal display panel.

Specifically, FIG. 1 is a cross-section view of the liquid-crystal display panel along the cutting line A—A of FIG. 3, this showing a CF-on-TFT type liquid-crystal display panel 100. As shown in this drawing, on a thin-film transistor (TFT) 218 formed by a source electrode of a TFT 214, gate electrode 212, and a drain electrode of the TFT 217, an amorphous silicon (a-Si) 213, color filters 207 and 215, and a black matrix (BM) 211 are patterned using exposure to light or the like, after which a columnar protrusion 203 disposed as a spacer within the contact hole 210.

The columnar protrusion 203 is formed between the two opposing glass substrates 201 and 216 of the liquid-crystal display panel 100, and establishes and maintains the gap 219 that sandwiches the liquid crystal 204 at a prescribed length.

The number of laminations of the plurality of types of function films formed on the surface of the glass substrate on the thin-film transistor side is relatively small, and each film is neither non-uniform nor unstable, such as is the case with conventional interconnects, there being a contact hole 210 made by a functional film with a stable uniform thickness, the spacers being formed in this part that has little variation in thickness, thereby making the height of the columnar spacers uniform, and enabling an improvement in the accuracy of the gap within the panel.

It is therefore possible to achieve a uniform retardation in the liquid crystal within the panel surfaces, thereby enabling the achievement of a display with improved quality.

As shown in FIG. 3, the columnar spacer 203 of the present invention can be provided at all of the contact holes 210 provided in the plurality of pixel regions 220, 221, and so on making up the liquid-crystal display panel 100, and if necessary are preferably provided at randomly selected contact holes in the pixel region, or at each contact hole at pre-established positions or at a pre-established spacing interval in the pixel region.

In particular in the color liquid-crystal display panel 100, it is possible and ideal in particular to provide columnar spacers 303 at uniformly selected contact holes 310 in the R, G, and B pixel regions, and also possible to select only one pixel region of the R, G, and B pixel regions, and provide columnar spacers 303 at either all or part of the select pixel region.

Referring to FIG. 1, therefore, an a-Si layer 213 is formed on the TFT-side glass substrate 216 of the present invention. A black matrix 211 is provided on this a-Si layer 213, and over this is further formed an overcoating film 206.

The overcoating film 206 and the color layer 207 are formed on the bottom of the TFT-side transparent electrode 205.

The TFT-side glass substrate 216, onto which the above-noted films are formed, is sandwiched at an interval of several micrometers by the opposing glass substrate 201, with the liquid crystal 204 therebetween.

According to the present invention, the columnar spacers 203 for maintaining the gap with respect to the opposing glass substrate 201 are formed on the contact hole parts 201 with a height of several micrometers. In this embodiment, it is desirable that the columnar spacers 203 be formed of an organic material, this being for example an acrylic resin.

In the present invention, of course, it is alternatively possible to make the columnar spacers 203 from an inorganic material.

In the above-described configuration, the height of the space is the total of the TFT-side transparent pixel electrode 205, the insulation film 209, the signal electrode 214 and the columnar spacer 203.

The TFT-side transparent pixel electrode 205, insulation film 209, source electrode of a TFT 214 and drain electrode of the TFT 217 are formed by a sputtering process or the like, the variation in the film thicknesses thereof being controllable to within several tens to several hundreds of Angstroms within the panel surfaces.

The columnar spacers 203 are formed application by spin-coating or printing, followed by exposure and development to perform patterning, the film thickness thereof being 0.1 to 0.2 $\mu$m.

Therefore, the variation in spacer height is almost equivalent to the variation in the columnar spacers 203, the effect being that it is possible to make the variation of the gap between the panel surfaces be the variation of the columnar spacers 203.

Figure 8:
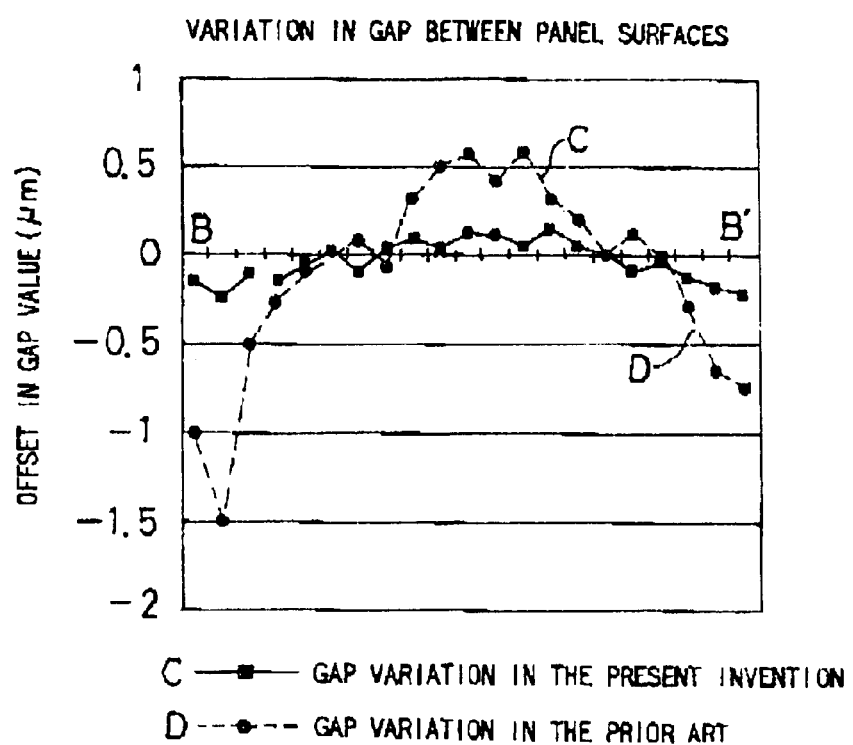
FIG. 8 is a graph showing a comparison of the characteristics values between a liquid-crystal display panel according to the present invention and a liquid-crystal display panel of the past.

The difference in the characteristics values of a liquid-crystal display panel 100 according to the present invention an a liquid-crystal display panel having a configuration of the past is shown in the graph of FIG. 8, which will be used to further describe the effect of the present invention.

The graph of FIG. 8 shows the amount of offset from the set panel gap value (center value) in the B–B' plane of FIG. 2.

As is clear from the curve D, in a liquid-crystal display panel 100 according to the prior art, the two end parts of the liquid crystal panel are fixed, but there is a tendency to a great narrowing of the gap with respect to the set value, and in the center part the gap is considerably greater than the set value.

In contrast to this, as shown clearly by curve C, in a liquid-crystal display panel 100 according to the present invention, there is a significant improvement in the panel gap accuracy.

The columnar spacers 203 in the present invention are manufactured, for example, as described below.

Spin-coating or printing or other method capable of obtaining a uniform film is used to apply a photosensitive acrylic resin resist to a CF-on-TFT substrate formed on the TFT-side glass substrate 216 from the gate electrode 212 to the TFT-side transparent pixel electrode 205, this film being applied to a thickness equivalent to the gap required for the panel, pre-heated to 60° C. to 120° C., and then exposed using a mask to achieve a prescribed patterning thereof.

After the above, developing is done, and burn-in is done at 200° C. to 250° C., so as to obtain columnar spacers 203 on the contact hole parts 210 of the prescribed pattern.

Figure 6:
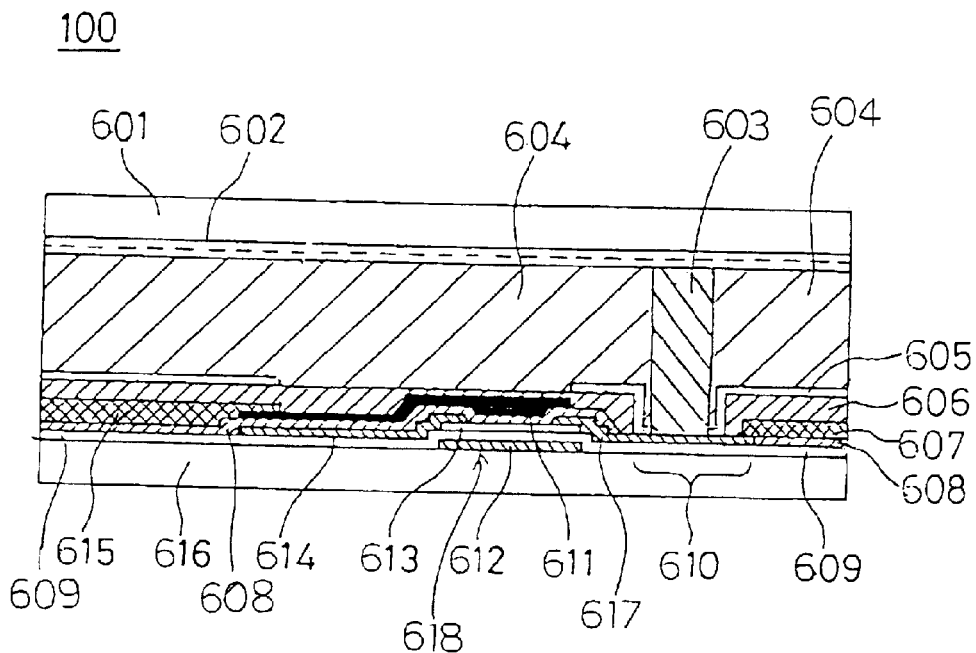
FIG. 6 is a cross-section view showing the configuration of yet another embodiment of a liquid-crystal display panel according to the present invention.

In another embodiment of a liquid-crystal display panel 100 according to the present invention, as shown in FIG. 6, before forming a TFT (618)-side transparent pixel electrode 605, the above-noted columnar spacers 603 can be applied and formed so as to obtain the same effect. In this case, cross-sectional area of the columnar spacers 603 is formed so as to be smaller than the contact hole parts 610.

In FIG. 6, in this embodiment, the two opposing substrates 616 and 601 are accurately set at the prescribed gap value with liquid crystal 604 interposed therebetween. And the substrate 601 is provided with a common transparent electrode 602.

On the other hand, 605 denotes a transparent pixel electrode, and further, 607 and 615 denote the color layers as well as 612, 613, 614, 617, 611 denote a gate electrode film layer, an amorphous silicon film layer, a signal electrode film layer (source electrode of a TFT), a drain electrode of the TFT and a black matrix film layer, respectively.

And further, 608 and 609 denote the insulation film layer, respectively and 606 denotes an overcoating film layer.

While, 616 denotes a TFT side glass substrate.

While the above-noted embodiment is described for the case of using a photosensitive acrylic resin, the same effect is achieved by using an organic resin material such as a non-photosensitive acrylic resin or polyimide, a black resist that forms the black matrix, or a color resist that forms a color layer.

Yet another embodiment of a liquid-crystal display panel 100 according to the present invention is described in detail below, with reference made to FIG. 5.

Specifically, in the liquid-crystal display panel 100 as in yet another embodiment, as shown in FIG. 5, the columnar spacers 503 are formed using an inorganic material.

More specifically, as shown in FIG. 5, an a-Si layer 513 is formed on a TFT (518)-side glass substrate 516. A black matrix is formed on the a-Si layer 513, and over this an overcoat 506 is formed.

Beneath the TFT-side transparent electrode 505 an overcoat 506 and color layer 507 formed.

According to the present invention, the columnar spacers 503 that maintain the gap with respect to the opposing glass substrate 501 provided with a common transparent electrode 502, are formed at contact hole parts 510 with a height of several micrometers. In this embodiment, the columnar spacers 503 are made of $SiO_2$.

In a liquid-crystal display panel 100 configured as described above, the height of the columnar space 503 is the total of the TFT-side transparent electrode 505, the insulation film 509, the drain electrode 517 of the TFT 518 and the columnar spacer 503.

In this embodiment, the TFT-side transparent pixel electrode 505, insulation film 509, and signal electrode 514 films are formed using sputtering or the like, the variation in film thickness thereof being controllable to within several tens to several hundreds of Angstroms within the panel surfaces.

The columnar spacers 503 are also formed by sputtering or the like, after which exposure and development are done to perform patterning, the variation in thickness thereof within the panel surfaces being within several tens to several hundreds of Angstroms.

It is therefore possible to form the spacers so that the variation in spacer height is less than 0.1 µm, the effect being that it is possible to make the variation of the gap between the panel surfaces be the variation of the columnar spacers 503.

Thus, in the liquid-crystal display panel 100 shown in FIG. 5, the columnar spacers 503 are manufactured by the method described below.

Specifically, sputtering or vacuum deposition or the like capable of obtaining a uniform film is used to apply an $SiO_2$ film onto CF-on-TFT substrate formed on the TFT-side glass substrate 516 from the gate electrode 512 to the TFT-side transparent pixel electrode 505, after which a resist for exposure is applied and a mask is used to obtain a prescribed patterning thereof. Then, etching is done to peel away the resist, thereby obtaining a columnar spacer 503 on the contact hole parts 510 of the prescribed pattern.

In FIG. 5, 507 and 515 denote the color layers as well as 504, 508, 511 and 513 denote liquid crystal, an insulation film, a black matrix film layer and an amorphous silicon film layer, respectively.

Yet another embodiment of a liquid-crystal display panel 100 according to the present invention is described below.

In this embodiment, as shown in FIG. 7, before forming the TFT-side transparent pixel electrode 705, the columnar spacers 703 can be formed using sputtering or vacuum deposition or the like to obtain the same effect. In this case, the cross-sectional area of the columnar spacers 703 is formed so as to be smaller than the contact hole parts 710.

In FIG. 7, in this embodiment, the two opposing substrates 716 and 701 are accurately set at the prescribed gap value with liquid crystal 704 interposed therebetween. And the substrate 701 is provided with a common transparent electrode 702.

On the other hand, 705 denotes a transparent pixel electrode, and further, 707 and 715 denote the color layers as well as 712, 713, 714, 717, 711 denote a gate electrode film layer, an amorphous silicon film layer, a signal electrode film layer (source electrode of a TFT 718), a drain electrode of the TFT and a black matrix film layer, respectively.

And further, 708 and 709 denote the insulation film layer, respectively and 706 denotes an overcoating film layer.

While, 716 denotes a TFT side glass substrate.

As is clear from the foregoing descriptions that a method for manufacturing a liquid-crystal display panel 100 according to the present invention is one in which, for example, a color layer, a signal electrode, a gate electrode, and a pixel electrode are formed on a plurality of pixel regions of a substrate, and a transparent electrode film is formed thereover, after which, on minimally a part of the contact holes provided in the pixel region, columnar spacers are formed on the transparent electrode film, followed by formation of an opposing substrate with an opposing common electrode opposite the transparent electrode film, with the columnar spacers therebetween.

The method of the present invention is alternatively a method in which a color layer, a signal electrode, a gate electrode, and a pixel electrode are formed on a plurality of pixel regions on a substrate, and then minimally on part of the contact holes provided in the pixel regions, columnar spacers are formed on the transparent electrode film, after which a transparent electrode film is formed on the color layer, the signal electrode, the gate electrode, and the pixel electrode, with the exception of the columnar spacers, following by forming of an opposing substrate with an opposing transparent electrode opposite the transparent electrode film, with the columnar spacers therebetween.

By adopting the configuration described in detail above, a liquid-crystal display panel, including a liquid-crystal display panel, and a method for manufacturing such a liquid-crystal display panel achieve a gap within the panel surfaces with superior uniformity, without a deterioration in display characteristics such as contrast.

What is claimed is:

1. A liquid-crystal display panel comprising:
    a plurality of pixels; and
    a columnar spacer formed and disposed on a portion of a surface of a multi-layered film, said film formed on a surface of a substrate facing a transparent electrode provided in at least a part of pixels among a plurality of pixel portions forming a liquid-crystal display panel, said portion of said multi-layered film having little variation in thickness that is disposed in a contact hole,
    wherein said columnar spacer is formed on a transparent pixel electrode film; and
    wherein in the region below the contact hole, the transparent pixel electrode film is formed on and in direct contact with a drain electrode of a TFT, said drain electrode of said TFT being formed on and in direct contact with an insulating film, and said insulating film being formed on and in direct contact with said substrate, and
    wherein a cross-sectional area of said columnar spacer is smaller than the contact hole and further wherein said columnar spacer contacts said drain electrode of said TFT via said transparent pixel electrode.

2. A liquid-crystal display panel according to claim 1, wherein said part of said pixel portion having little variation in film thickness is a contact hole.

3. A liquid-crystal display panel according to claim 1, wherein said columnar spacer is made of a material selected from a group consisting of an inorganic material and an organic material.

4. A liquid-crystal display panel according to claim 1, wherein the type of said liquid-crystal display panel is one type selected from a group consisting of a color type and a monochrome type.

5. A liquid-crystal display panel according to claim 1, wherein said variation in the thickness of said portion of said multi-layer films is 0.1 µm to 0.2 µm.

6. A liquid-crystal display panel according to claim 1, wherein said variation in the thickness of said portion of said multi-layer films is within several tens of angstroms.

7. A liquid-crystal display panel according to claim 1, wherein said variation in the thickness of said portion of said multi-layer films is within several hundreds of angstroms.

8. A liquid-crystal display panel comprising:

a plurality of pixels; and a columnar spacer formed and disposed on a portion of a surface of a multi-layered film, said film formed on a surface of a substrate facing a transparent electrode provided in at least a part of pixels among a plurality of pixel portions forming a liquid-crystal display panel, said portion of said multi-layered film having little variation in thickness that is disposed in a contact hole, wherein said columnar spacer is formed on a drain electrode of a TFT, and passes through a transparent pixel electrode film, wherein in the region below the contact hole, said drain electrode of said TFT is formed on and in direct contact with an insulating film, said insulating film is formed on and in direct contact with said substrate, and wherein a cross-sectional area of said columnar spacer is smaller than the contact hole and further wherein said columnar spacer contacts said drain electrode of said TFT through said transparent pixel electrode.

9. A method for manufacturing a liquid-crystal display panel comprising:

forming in each of a plurality of pixel regions on a substrate a color film, a source electrode of a TFT, a gate electrode, and a drain electrode of the TFT;

forming a transparent pixel electrode film thereover;

then forming a columnar spacer on said transparent pixel electrode film at least in a part of contact holes provided on said pixel regions; and then disposing an opposing substrate on which is formed an opposing common transparent electrode so as to oppose said transparent pixel electrode film, wherein a cross-sectional area of said columnar spacer is smaller than the contact hole.

10. A method for manufacturing a liquid-crystal display panel according to claim 9, wherein said columnar spacer is made of a material selected from a group consisting of an inorganic material and an organic material.

11. A method for manufacturing a liquid-crystal display panel comprising:

forming in each of a plurality of pixel regions on a substrate a color film, a source electrode of a TFT, a gate electrode and a drain electrode of the TFT;

then forming a columnar spacer on said drain electrode of the TFT at least in a part of said contact holes provided on said pixel regions;

forming a transparent pixel electrode film on said color film, source electrode of the TFT, gate electrode, and drain electrode of the TFT, with the exception of said columnar spacer; and then disposing an opposing substrate on which is formed an opposing common transparent pixel electrode so as to oppose said transparent electrode film, with intreposing said columnar spacer therebetween, wherein a cross-sectional area of said columnar spacer is smaller than the contact hole and further wherein said columnar spacer contacts said drain electrode of said TFT through said transparent pixel electrode.

* * * * *

UNITED STATES PATENT AND TRADEMARK OFFICE
CERTIFICATE OF CORRECTION

| | | |
|---|---|---|
| PATENT NO. | : 6,870,592 B1 | Page 1 of 1 |
| APPLICATION NO. | : 09/594721 | |
| DATED | : March 22, 2005 | |
| INVENTOR(S) | : Yuji Yamamoto et al. | |

It is certified that error appears in the above-identified patent and that said Letters Patent is hereby corrected as shown below:

Title Page, Item (56) References Cited, "Foreign Patent Documents" add:

JP 2000-122071  4/2000
JP 08-0334787  12/1996
JP 10-0153797  6/1998
JP 05-066410  3/1993
JP 10-096955  4/1998

Signed and Sealed this

Twenty-third Day of August, 2011

David J. Kappos
*Director of the United States Patent and Trademark Office*